3,371,707
METHOD AND APPARATUS FOR CONTROLLING THE TEMPERATURE IN A ROOM
Nils Rudolf Martin Weibull, Malmo, Sweden, assignor to Ingenjorsfirman Nils Weibull AB, Malmo, Sweden
Continuation-in-part of application Ser. No. 501,073, Oct. 22, 1965. This application Dec. 30, 1966, Ser. No. 613,702
10 Claims. (Cl. 165—2)

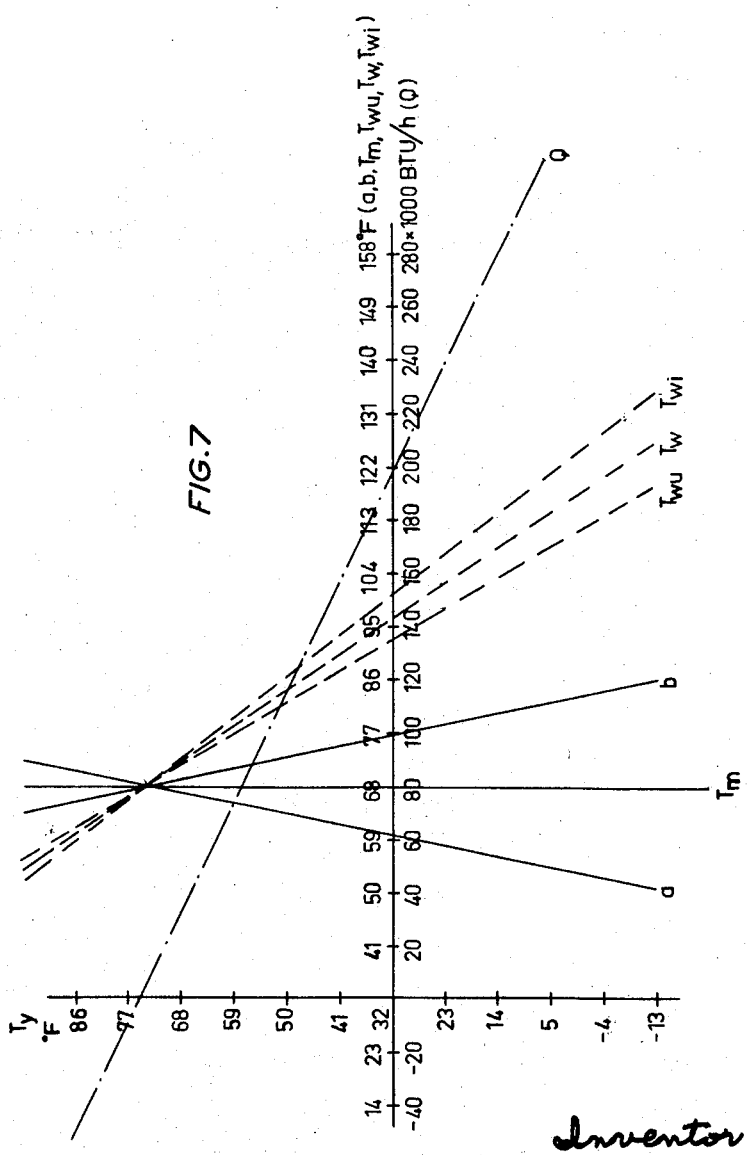

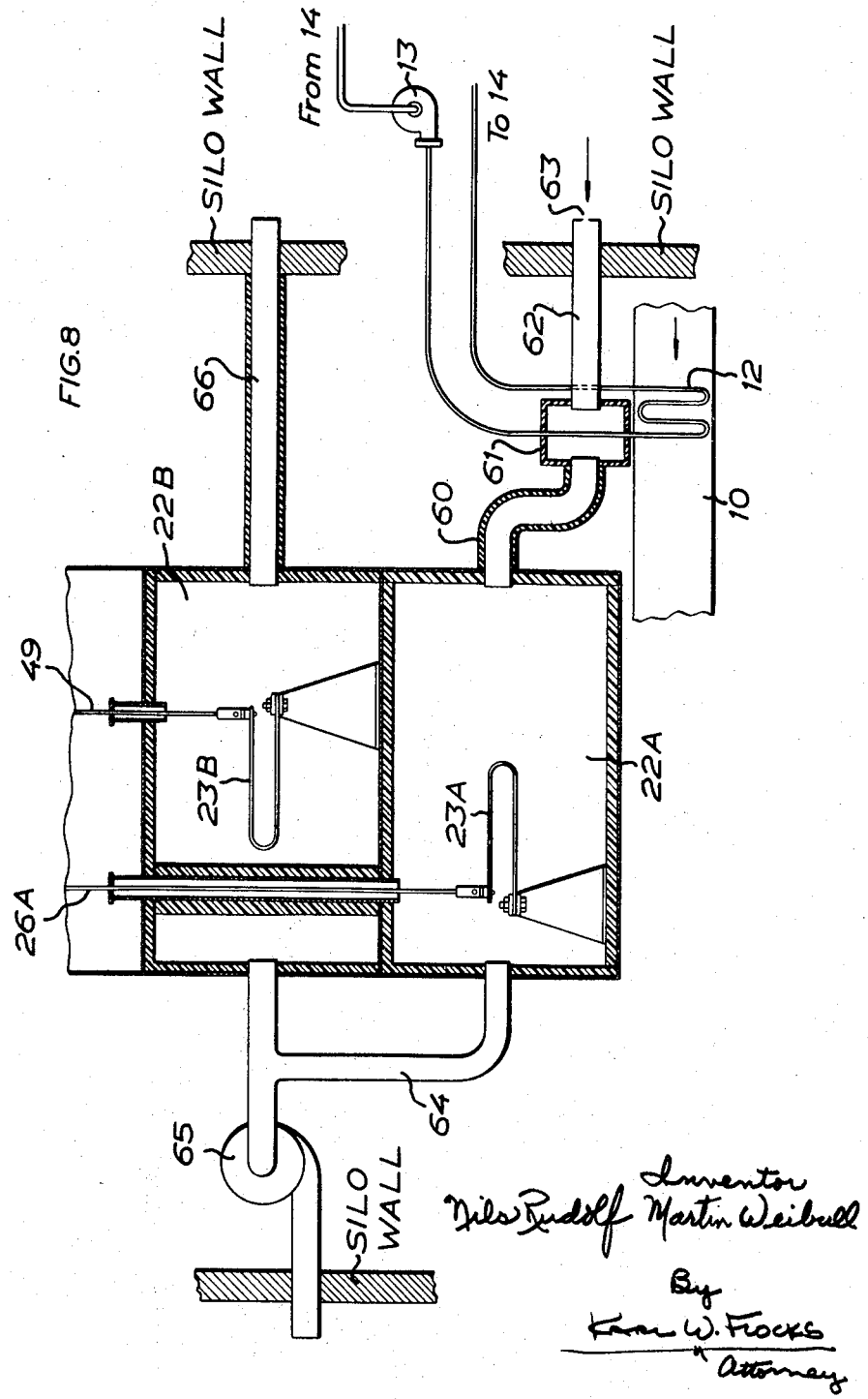

ABSTRACT OF THE DISCLOSURE

Method and apparatus for controlling the temperature in a room by the control of the heat transfer to or from such room in response to the arithmetic mean value of two temperatures, having an arithmetic mean value which is proportional to the mean value of the temperature of the room.

---

This application relates to method and apparatus for controlling the temperature in a room and is a continuation-in-part of copending application Ser. No. 501,073, filed Oct. 22, 1965, now abandoned, which in turn is a continuation-in-part of application Ser. No. 358,892, filed Apr. 10, 1964, now abandoned.

Broadly the invention relates to a method of controlling the temperature in a room, having means for heat transfer between a heat carrier and said room.

More particularly the invention relates to a method of controlling the temperature in a room in which said heat transfer means includes a heat exchanger and means for circulating a heat carrier through said heat exchanger.

Still more particularly the invention relates to a method of controlling the temperature in a room, especially a silo room, in which said heat transfer means includes a closed air duct system in the floor, walls and ceiling of the room and a fan and heat exchanger in this air duct system, the flow direction of the air in the air duct system being periodically reversed.

Silos for bulk-storing sugar, grain, artificial manure and similar materials, having a closed air duct system in the floor, walls and ceiling of the silo, and a fan and heat exchanger in the air duct system are known wherein the flow direction of the air in the air duct system is automatically reversed in dependence on a timer or the like and the temperature of the circulating air is controlled by means of a thermostat controlling the supply of a heating or cooling medium to the heat exchanger in order to maintain a predetermined constant temperature inside of the silo. This thermostat has hitherto been arranged in the air space above the material stored in the silo to be responsive to the air temperature therein but such a thermostat frequently fails to keep appropriate storing conditions.

It would be more advantageous for the control to rely not on the air temperature above the material in the silo but on the mean temperature of the air circulating in the air duct system for control of the storing temperature in the silo. However, a direct detection of this mean temperature entails difficulties since it is not possible exactly to localize the point in the air duct system where the mean temperature is to be found and since this point besides has no fixed position but changes position with varying outdoor temperature.

In order to overcome the inconveniences and difficulties referred to above, the present invention provides in its broadest aspect in the method referred to above the steps of detecting a first temperature and a second temperature, the arithmetic mean value of said first and second temperatures being proportional to the mean value of the temperature of the room, deriving from the detected temperatures any deviation in either direction from a predetermined arithmetic mean value of the detected temperatures, and controlling the heat transfer of said heat transfer means in dependence on derived deviation from the predetermined mean value for cooling said room in case of an upward deviation and for heating said room in case of a downward deviation from the predetermined mean value.

In the specific embodiments of the heat transfer means described above, said first and second temperatures may be the temperature of the heat carrier delivered to said heat exchanger and the temperature outside the silo or, alternatively, the temperatures of the circulating air on either side of the heat exchanger.

The present invention also concerns an apparatus for carrying out the method according to the invention and will be described more in detail below in conjunction with this apparatus, reference being made to the accompanying drawings in which:

FIG. 7 is a diagram showing different temperature characteristics for a special silo having the temperature control system shown in FIG. 1;

FIG. 8 is a fragmentary vertical sectional view showing a further practical embodiment of the apparatus according to the invention.

Figure 1:
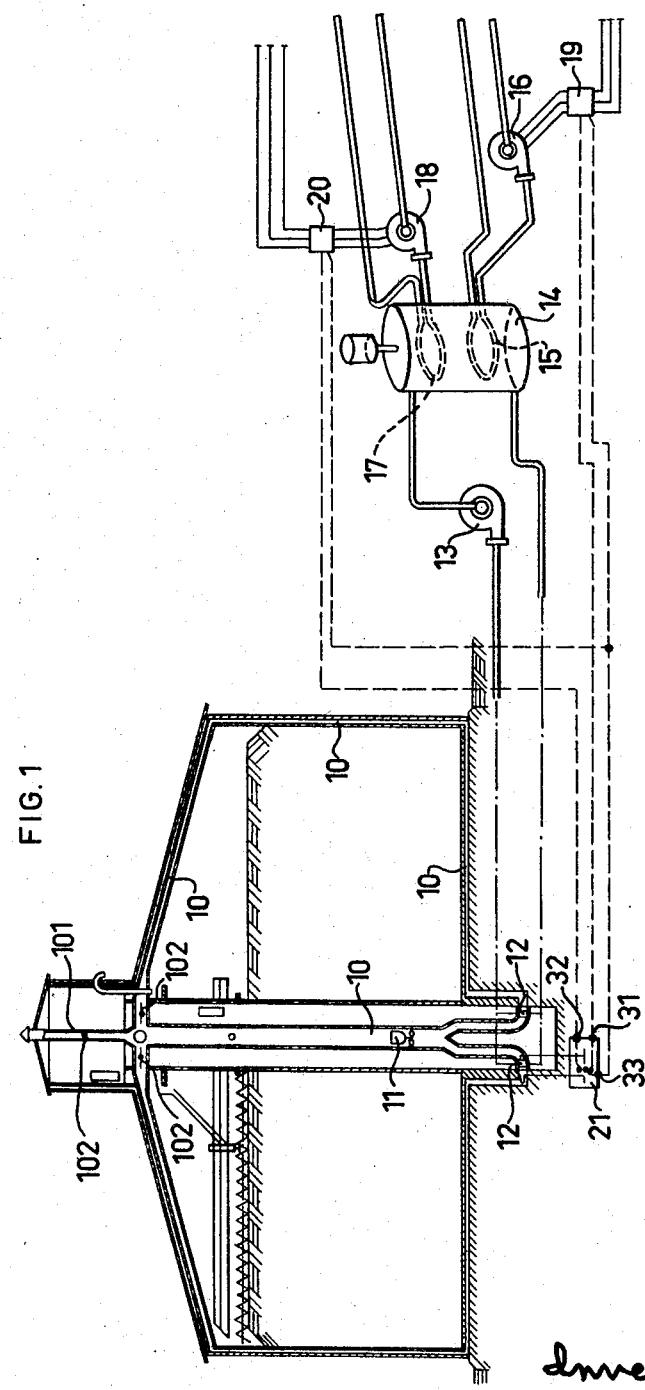
FIG. 1 is a central vertical sectional view of a silo with the temperature control system schematically shown.

The silo shown in FIG. 1 comprises a closed air duct system 10 in the floor, walls and ceiling, and a reversible fan 11 for circulation of air in the air duct system. To the air duct system 10 there is connected a conduit 101 projecting from the silo on the top thereof and communicating with the atmosphere at its outer end. Selectively operated valves 102 are provided for regulating the renewal of air in the air duct system 10. The means for reversing the direction of rotation of the fan are not shown; for further details reference is made to U.S. patent specification No. 2,935,263, issued on May 3, 1960. Two heat exchangers 12 are provided for heating or cooling the circulating air, and through these heat exchangers water is circulated by means of a pump 13 from a tank 14. In this tank there is provided a heating loop 15 in which hot water is circulated by means of a pump 16, and a cooling loop 17 in which cooling water is circulated by means of a pump 18. The pumps 16 and 18 are assumed to have electrical motors with a contactor 19 and 20, respectively, and these contactors are controlled in such a way that the pumps 16 and 18 are kept running to the extent necessary for heating and cooling, respectively, of the air circulating in the air duct system 10.

Figure 2:
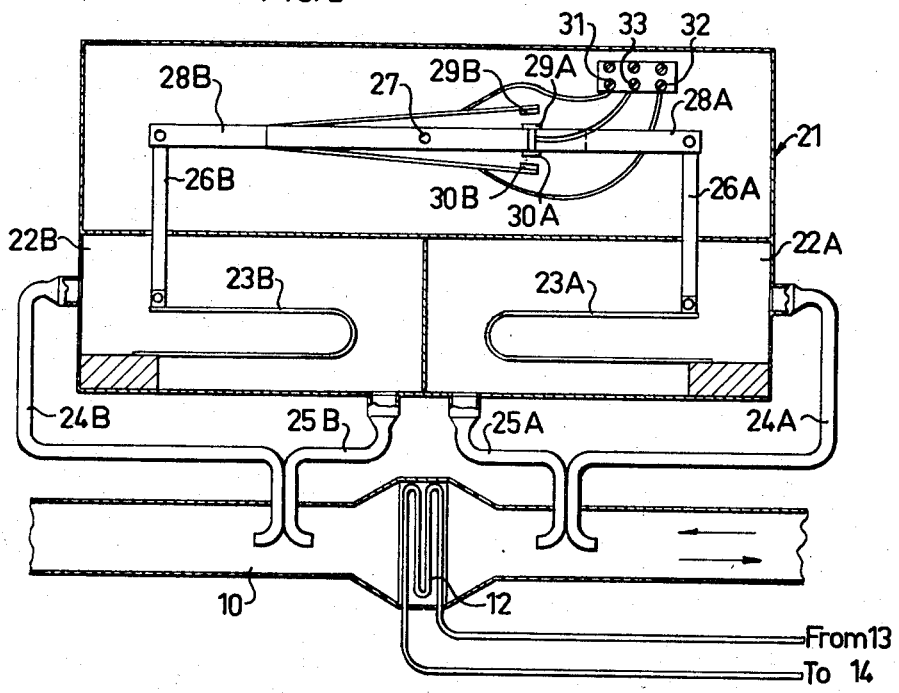
FIGS. 2 to 5 are schematic views of the apparatus according to the invention included in the temperature control system in various operation conditions.
Figure 3:
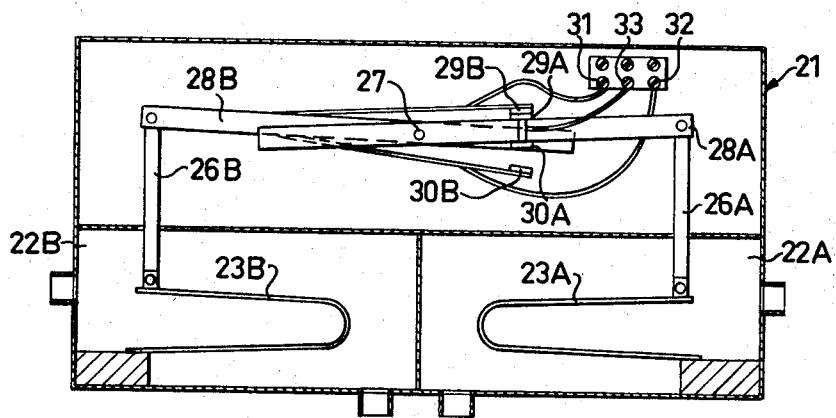
Figure 4:
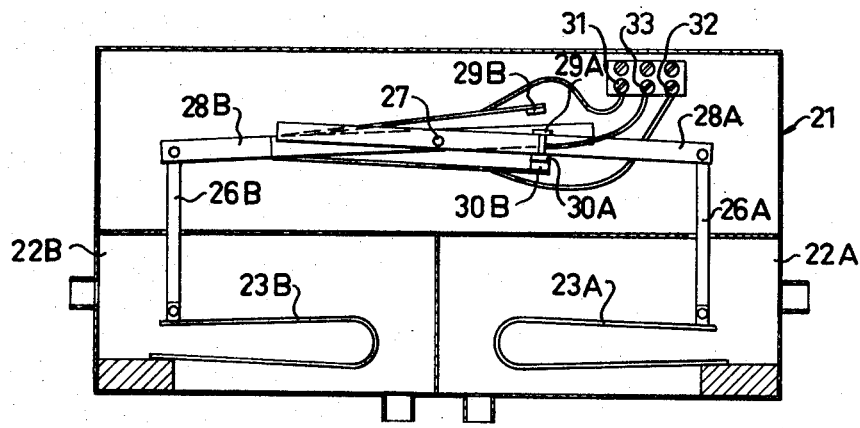
Figure 5:
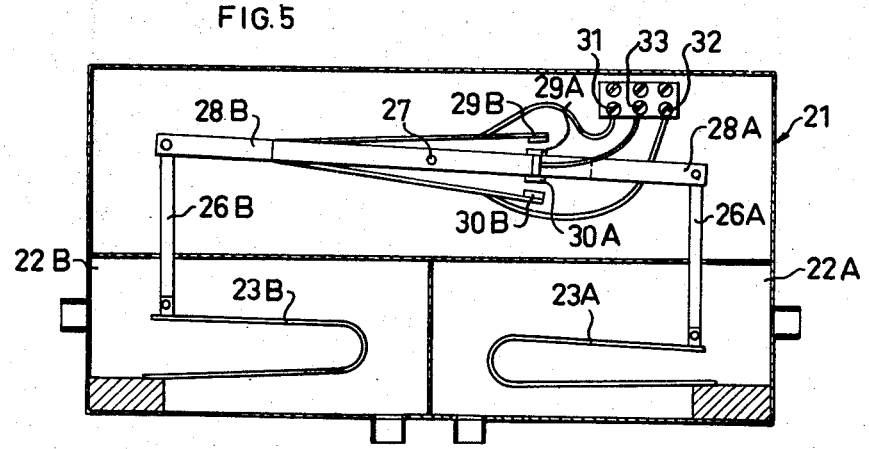

The apparatus according to the invention for control of the contactors 19 and 20 is generally designated 21 in FIG. 1 and is shown more in detail in FIGS. 2 to 5. FIG. 2 shows a section of the air duct system 10 with one of the heat exchangers 12. Two chambers 22A and 22B contain each a U-shaped bimetal spring 23A and 23B, respectively, and communicate at their ends with pipelines or hose conduits 24A, 25A and 24B, 25B, respectively. These conduits with their oppositely directed openings open into the air duct system in the longitudinal direction of the air duct system, the conduits 24A and 25A having their openings on one side of the heat exchanger 12 and conduits 24B and 25B on the other side of the heat exchanger. Irrespective of the direction of the flow in the air duct system, one of chambers 22A, 22B will be passed by air from one side of the heat exchanger and the other by air from the other side of the heat exchanger. The two bimetal springs are thus acted upon by the temperature before and after the heat exchanger, respectively. The arms of these bimetal springs converge during heating and diverge during cooling and the bimetal springs are secured by one arm to the corresponding chamber while the other arm by means of a link 26A and 26B, respectively, is connected to one and the other, respectively, of a pair of instrument levers 28A and 28B, respectively, which are swingable about a point 27. Lever 28A has a pair of contacts 29A and 30A and lever 28B a pair of contacts 29B and 30B, the two first-mentioned contacts being electrically connected and situated between contacts 29B and 30B and adapted to cooperate each with one of the latter. Contacts 29B and 30B are connected, each at one terminal 31 and 32, respectively, and contacts 29A and 30A are connected, at a terminal 33 which they have in common, to contactors 19 and 20 in a manner which appears more in detail from FIG. 1, the closure of contacts 29A and 29B causing contactor 19 to be closed for operation of pump 16 while the closure of contacts 30A and 30B causes contactor 20 to be closed for operation of pump 18.

It is assumed that the temperatures before and after the heat exchanger 12 are equal and that the contacts are in the intermediary position shown in FIG. 2 which position is assumed to correspond to the desired mean temperature of the silo temperature. Both pumps 16 and 18 are then stationary. If the temperature of the circulating air should fall or rise above the mean value corresponding to FIG. 2, the contacts will occupy the positions shown in FIG. 3 and FIG. 4, respectively, in which the heat exchanger 12 will respectively heat and cool the circulating air. The temperature of this air will then approach the desired mean value and as soon as this is attained, the contacts will occupy the intermediary position shown in FIG. 5, in which pumps 16 and 18 are stationary but heat is supplied to the air or removed therefrom by means of the heat exchanger 12. Any deviation from the predetermined mean value will cause either pump 16 or 18 to be set in motion in dependence on the deviation being downward or upward.

If the temperature of the air arriving at the heat exchanger is $a$ and the temperature of the air leaving the heat exchanger is $b$, the arithmetic mean value of these temperatures will be $$T_m = \frac{a+b}{2}$$

When the ambient temperature $T_y$ is lower than the mean interior temperature $T_i$ of the silo, the circulating air in duct system 10 will arrive to heat exchanger 12 with a temperature ($a$) lower than the mean interior temperature $T_i$ of the silo. If it is desired to maintain the silo temperature $T_i$ constant, the heat exchanger must heat the circulating air to a temperature higher than $T_i$. If the ambient temperature $T_y$ is higher than the desired silo temperature $T_i$, the conditions will be reversed and the heat exchanger should cool the circulating air. In both cases, $b-a$ will be proportional to $T_i-T_y$ and the total heat loss of the silo should be proportional to $T_m$. On the other hand there will be a heat exchange from the circulating air to the air inside of the silo in the direction to the silo air as long as the temperature of the circulating air is higher than $T_i$ and in the opposite direction when the temperature of the circulating air has fallen below $T_i$ through the influence of the ambient air $T_y$. The heat units in this way going into the silo room will be equal to the ones going out of the silo room and consequently make no loss or gain of heat.

The distribution of the temperature in the circulating air is given by the following formula:

$$(1+\alpha)a = [b(1+\alpha) - T_y - \alpha T_i]e^{-(1+\alpha) \cdot K} + T_y + T_i$$

where $a$, $b$, $T_i$ and $T_y$ are temperatures defined in the preceding paragraph, $$\alpha = \frac{k_i}{k_y}$$

where $k_i$ and $k_y$ are coefficients indicating the heat transmission through the inner and outer wall of the air duct system, respectively, $e$ is the basis of natural logarithm system, and $K$ is a coefficient indicating the temperature gradient of the actual situation, consequently $$K = \frac{b-a}{T_i - T_y}$$

for stationary temperature conditions.

If the heat transmission through the inner wall $k_i$ of the air duct is very large compared to the heat transmission through the outer wall $k_y$, $\alpha$ will increase accordingly. As the formula indicates the temperature $a$ of the circulating air entering the heat exchanger will—at an ambient temperature $T_y$ lower than $T_i$—take a value which is slightly below $T_i$ or, when $T_y$ is higher than $T_i$, $a$ will be slightly above the temperature $T_i$.

If the instrument levers 28A and 28B have the same length and are connected to two identical bimetal springs 23A and 23B or other bimetal elements, temperatures $a$ and $b$ always will take values which will be equally spaced on both sides of the set mean temperature, i.e.

$$T_m - a = b - T_m$$

but, when it is desired to maintain an exact temperature $T_i$ in the silo, it is necessary to add or remove a certain quantity of heat. The quantity of heat needed is however proportional to $T_i - T_y$ and as the heat to be added or removed also is proportional to $b-a$, a certain correction might be introduced e.g. by making the instrument levers 28A and 28B of unequal length or the characteristics of the two bimetal springs 23A and 23B different. For practical purposes where $\alpha$ is about 10 it may not be necessary to adjust neither the length of the instrument levers nor the characteristics of the bimetal springs. In certain cases it is however of interest to have this possibility available. In this case the apparatus is equipped with a transmission arrangement as shown in FIG. 6.

Figure 6:
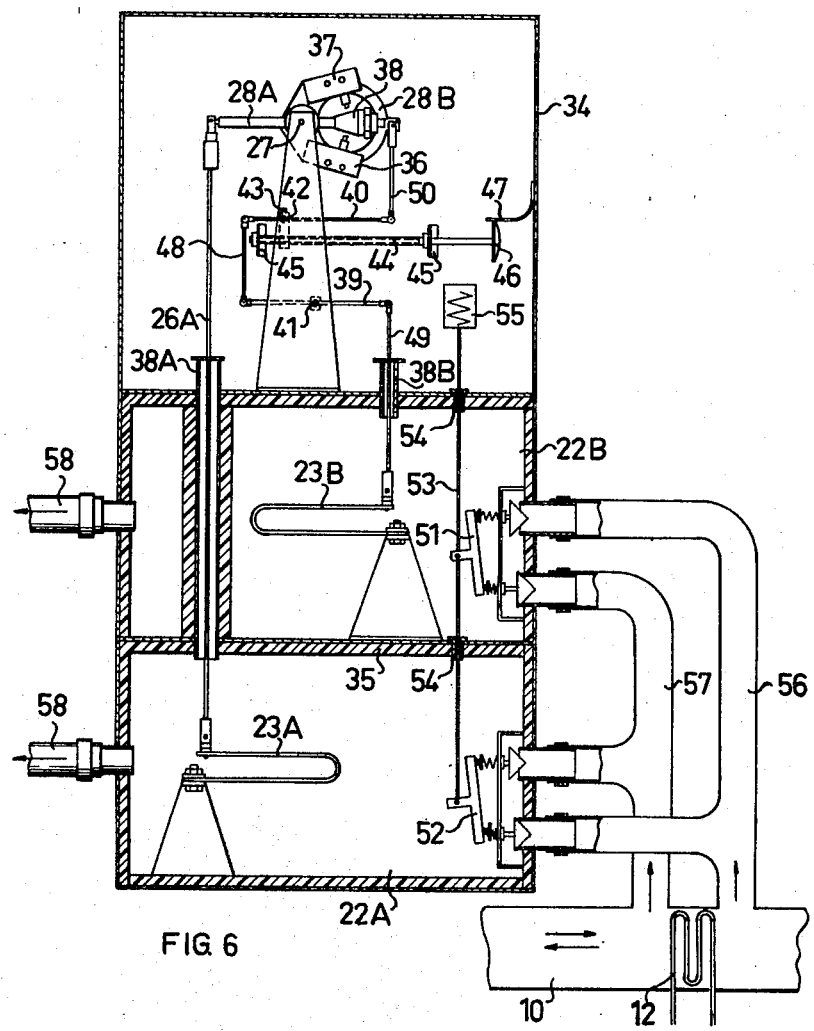
FIG. 6 is a vertical sectional view showing a practical embodiment of this apparatus.

In the practical embodiment according to FIG. 6 the two chambers 22A and 22B are superposed and encased together with the contact system in a dust-proof housing 34. The chambers are heat-insulated, for instance by means of cellular plastic 35. The contact system here comprises two micro-switches 36 and 37 of the push-button type on the lever 28B and a conical actuator 38 on the lever 28A for actuation of the push-button of these switches, of which the switch 36 corresponds to contacts 29A and 29B, and switch 37 corresponds to contacts 30A and 30B. Either switch is kept closed as long as the push-button is pressed in, while it is opened when the push-button is not actuated. The conical actuator 38 is adjustable in different axial positions on lever 28A, for instance being screwed on this lever in order to make it possible to control the interval between opening one switch and closing the other, whereby the tolerance with respect to the maintenance of the mean temperature can be regulated.

As explained the arithmetic mean value of the temperature $T_m$ of the air temperatures $a$ and $b$, where $a$ is the temperature of the air entering heat exchanger 12 and $b$ is the temperature of the air leaving the heat exchanger, does never coincide exactly with the mean inside silo temperature $T_i$. This fact depends on the, exchange of heat through the inner wall between the circulating air and the air inside of the silo. The larger the difference between the heat transmission coefficient of these two walls is, the greater is the difference between the two temperatures $T_m$ and $T_i$. The error—generally of no importance—can be corrected e.g. by making the two instrument levers of unequal length and in this case by an arrangement for reversing the air flow through the bimetal chambers 22A and 22B by installing an adjustable lever transmission and valve arrangement operated by the same reversing means as is used for reversing the fan 11 shown on FIG. 1.

In FIG. 6 link 26B is replaced by a lever and link system including two levers 39 and 40, each with two free ends and pivoted in a bearing 41 and 42, respectively. Pivot bearing 42 is slidable on lever 40 to which it can be locked by means of a set screw 43, and is supported by a screw 44 passing through a threaded part of the pivot bearing 42 and being rotatably but non-slidingly supported by two journal boxes 45. Screw 44 has at one end a knob 46 which can be locked in a certain position with a lock spring 47 after being turned in order to adjust the position of the pivot bearing 42. Levers 39 and 40 are at one end hinged together by a link 48 while the other end of lever 39 is connected to bimetal spring 23B by a link 49 and the other end of lever 40 is hinged to instrument lever 28B by a link 50. The two links 26A and 49 pass through air sealings 38A and 38B, and one or both of these links may be adjustable as to its length, for instance by a screw fitting, to allow variation of the desired mean temperature by changing the relative lengths of the links.

According to FIG. 6 the apparatus shown therein also comprises an arrangement for reversing the air flow through bimetal chambers 22A and 22B. Two pairs of valve mechanisms 51 and 52 are operated by a rod 53 slidably supported in bearings 54 and connected to valve mechanisms 51 and 52. Rod 53 can be operated in a known way by means of an electromagnet, a solenoid or a compressed air membrane 55 electrically or mechanically connected to be operated simultaneously with the reversing mechanism, not shown, of fan 11 of FIG. 1. Each valve mechanism 51 and 52 controls two openings one communicating with air duct system 10 through a conduit 56 on one side of heat exchanger 12 and the other one communicating with air duct system 10 through a conduit 57 on the other side of the heat exchanger. The valve mechanisms are interrelated in such a manner that irrespective of the flow direction of the circulating air in air duct system 10, a predetermined one of chambers 22A and 22B is always supplied with air from the inlet side of heat exchanger 12, the other one of said chambers receiving air from the outlet side of the heat exchanger. The air is supplied to the chambers at a low rate and is vented to the atmosphere from each chamber through an outlet 58 by a fan, not shown.

If the heat transmission coefficients of the inner and outer walls of the air duct system and of the heat exchangers of a special silo are known, the relationships between $T_y$, $a$, $b$ and $T_m$ as defined above as well as the temperature of water coming to the heat exchangers 12, $T_{wi}$, the temperature of water leaving the heat exchangers, $T_{wu}$, the arithmetic mean value of said water temperatures, $T_w$, and the heat requirement Q of the silo for a predetermined silo temperature $T_i$ may be calculated and illustrated diagrammatically as shown in FIG. 7. The diagram of FIG. 7 relates to a practical embodiment of a silo according to FIG. 1 having the following data:

| | |
|---|---|
| Size of heating surface of heat exchangers 12 _____sq. ft__ | 689 |
| Capacity of heat exchangers 12 __B.t.u./h.° F__ | 5,600 |
| Capacity of air circulating fan 11 ___cu. ft./h__ | 640,000 |
| Capacity of water circulating pump 18 cu. ft./min__ | 7 |
| Presumed ground temperature _____° F__ | 46.4 |
| Presumed heat transmission coefficient floor _____B.t.u./sq. ft. ° F. h__ | 0.11 |
| Wall _____do____ | 0.086 |
| Roof _____do____ | 0.14 |
| Silo diameter _____ | 116' |
| Silo wall height _____ | 103'9" |
| Silo storing capacity _____Sh. T__ | 26,000 |

The characteristics shown in FIG. 7 are calculated for a mean silo room temperature of substantially 68° F. The Q line on the right side of the ordinate line represents heating of the silo room whereas the Q line on the left side of the ordinate line represents cooling of the silo room. It is noted that at an outer temperature $T_y$ of 68° F. the silo room is still heated, although said value of the outer temperature is the same as that which is to be kept in the silo room since there is a loss of heat through the floor to the ground presumed to have a temperature of 46.4° F. At an outer temperature $T_y$ of about 75° F., however, there occurs neither heating nor cooling of the silo room, as is indicated by the crossing point of the lines representing the air and water temperatures.

Now, it is apparent from the diagram of FIG. 7 that it is not necessary to use the temperature of the circulating air in order to control the temperature of the silo room. For the same purpose the temperature of water coming to the heat exchangers, $T_{wi}$, and the outer temperature, $T_y$, may be used in applying the method according to the invention. Thus, the temperature of the silo room, $T_i$, is proportional to the arithmetic mean value of $T_{wi}$ and $T_i$, i.e.

$$T_i = c\frac{T_{wi} + T_y}{2}$$

where $c$ is a constant factor. An apparatus operating according to this principle is shown in FIG. 8.

In the apparatus according to FIG. 8 the two identical bimetal springs 23A and 23B or other bimetal elements are arranged in chamber 22A and 22B, respectively, and are connected to a lever and contact system as that shown in FIG. 6 by a link 26A and a link 49, respectively, to operate said system in the manner previously described. However, air is circulated through chambers 22A and 22B in a manner different from that shown in FIG. 6. Thus, chamber 22A is connected at one end by a heat insulated conduit 60 to a heat insulated chamber 61 which in turn is connected to a conduit 62 leading through the silo wall to the outer atmosphere and having a restricted opening 63 at its outer end. Chamber 61 is traversed by the water conduit leading from pump 13 to heat exchanger 12 in air duct system 10 and is situated close to the inlet of the heat exchanger. At its other end chamber 22A is connected to a conduit 64 which communicates with an air fan 65 exhausting to the outer atmosphere through the silo wall. This fan 65 draws air from the atmosphere outside the silo through the restricted opening 63 and conduit 62 into chamber 61 where the air passes around the inlet water conduit of heat exchanger 12. The air is thereby heated and if the rate of air flow is kept very low on account of the restriction at 63 and chamber 61 is sufficiently large the dwelling time of the outer air drawn into chamber 61 may be sufficient for such air to be heated substantially to the same temperature as that of the incoming water. Thus, air drawn from chamber 61 through conduit 60 into chamber 22A may have a temperature substantially representing the temperature $T_{wi}$ of water coming to heat exchanger 12, and bimetal element 23A is actuated by such temperature. The air in chamber 22A is exhausted through conduit 64 by fan 65.

It is appreciated that bimetal element 23A may be arranged to be actuated by the water flowing into heat exchanger 12 to sense directly the temperature of such water.

Chamber 22B communicates at one end with the outer atmosphere through a heat insulated conduit 66 passing through the silo wall and is connected at the other end to air fan 65. Conduit 66 has no restriction and air is drawn from the outer atmosphere through chamber 22B by fan 65 at a high rate of air flow in order to actuate bimetal element 23B by air having substantially the same temperature as the air surrounding the silo.

In the manner previously described the two temperatures actuating bimetal elements 23A and 23B, $T_{wi}$ and $T_y$, respectively, are handled in the way previously described in order to derive the arithmetic mean value thereof and to produce in dependence of deviation from a predetermined mean value output signals controlling contactors 19 and 20 (FIG. 1).

It will be seen that the embodiment described in connection with FIG. 8 may be used in controlling the temperature of a room which is heated or cooled by other heat transfer means than those circulating air in a closed air duct system as the control of the temperature is independent of the temperature of circulating air in such system.

The embodiments described and shown may be modified within the scope of the invention.

What I claim and desire to secure by Letters Patent is:

1. In a method of controlling the temperature in a room, having means for heat transfer between a heat carrier and said room, the steps of detecting a first temperature and a second temperature, the arithmetic mean value of said first and second temperatures being proportional to the mean value of the temperature of the room, deriving from the detected temperatures any deviation in either direction from a predetermined arithmetic mean value of the detected temperatures, and controlling the heat transfer of said heat transfer means in dependence on derived deviation from the predetermined mean value for cooling said room in case of an upward deviation and for heating said room in case of a downward deviation from the predetermined mean value.

2. In an apparatus for controlling the temperature in a room having means for heat transfer between a heat carrier and said room, the combination comprising two temperature sensing bodies arranged to sense first and second temperatures, respectively, the arithmetic mean value of which is proportional to the mean value of the temperature of the room, means connected to these temperature sensing bodies for deriving one of two control signals in dependence on whether the arithmetic mean value of the temperature signals received from the temperature sensing bodies increases above or decreases below the predetermined value, and means responsive to the control signals for controlling the heat transfer of said heat transfer means.

3. The combination as claimed in claim 2 in an apparatus for controlling the temperature in a room in which said heat transfer means includes a heat exchanger and means for circulating a heat carrier through said heat exchanger, wherein one of said two temperature sensing bodies is arranged on the heat carrier input side of said heat exchanger to sense the temperature of said heat carrier arriving at the heat exchanger and the other one of said two temperature sensing bodies is arranged outside the room to sense the temperature of the surrounding air.

4. The combination as claimed in claim 3 in an apparatus for controlling the temperature in a room in which said heat transfer means includes a closed air duct system in the floor, walls and ceiling of the room and a fan and heat exchanger in this air duct system, wherein said two temperature sensing bodies are arranged one on each side of said heat exchanger to sense the air temperature on the input side and the output side, respectively, of the heat exchanger.

5. The combination as claimed in claim 4, in which the temperature sensing bodies each consist of a bimetal element and the means for deriving the control signals consist of a pair of instrument levers which are swingable about a common pivot and are connected each to one of the bimetal elements, a temperature increase in one bimetal element causing swinging movement of the associated instrument lever in a direction contrary to the swinging movement caused in the other instrument lever at a temperature increase in the associated bimetal element, two separate chambers each enclosing one of said bimetal elements, means for passing one of two air streams at substantially said first and second temperatures, respectively, through each of said chambers, and a pair of contact means supported by the instrument levers and adapted to close control circuits for said heat transfer means at relative motion between the instrument levers in one and the other swinging direction, respectively, from an intermediary position in which both the contact means are unactuated.

6. The combination as claimed in claim 5, further comprising between one of said instrument levers and the related bimetal element a transmission consisting of two transmission levers, a pivotbearing means for each transmission lever between the ends thereof, means mounting at least one of said pivot-bearing means for each transmission lever between the ends thereof, means mounting at least one of said pivot-bearing means for movement lengthwise of the related transmission lever, a link interconnecting said transmission levers at one end thereof, a link connecting the other end of one of said transmission levers with said one instrument lever, and a link connecting the other end of the other one of said transmission levers with said related bimetal element.

7. The combination as claimed in claim 5, in which the contact means consists of a pair of push-button type switches supported by one instrument lever and provided on either side of the other instrument lever to be actuated by this lever during relative motion between said levers in one and the other swinging direction, respectively, from said intermediary position.

8. The combination as claimed in claim 7, in which said other instrument lever is provided with a conical means permitting said instrument lever to be brought into application against the push-buttons of the switches when establishing contact, said conical means being adjustable in various axial positions on said other lever.

9. The combination as claimed in claim 5, in which there is arranged between the instrument levers and the bimetal elements connection links at least one of which is adjustable to its length for control of said intermediary position.

10. The combination of steps as claimed in claim 1 in a method of controlling the temperature in a room further including periodically reversing the direction of flow of the heat carrier.

References Cited

UNITED STATES PATENTS

| 1,853,459 | 4/1932 | Russell et al. | 165—97 |
| 2,258,021 | 10/1941 | Locke | 165—28 |
| 2,417,761 | 3/1947 | Kleen | 165—28 |

ROBERT A. O'LEARY, *Primary Examiner.*

CHARLES SUKALO, *Examiner.*